United States Patent
Wang

(10) Patent No.: US 10,984,226 B2
(45) Date of Patent: Apr. 20, 2021

(54) METHOD AND APPARATUS FOR INPUTTING EMOTICON

(71) Applicant: BEIJING BAIDU NETCOM SCIENCE AND TECHNOLOGY CO., LTD., Beijing (CN)

(72) Inventor: Yi Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 16/026,741

(22) Filed: Jul. 3, 2018

(65) Prior Publication Data
US 2019/0012527 A1    Jan. 10, 2019

(30) Foreign Application Priority Data

Jul. 4, 2017   (CN) .......................... 201710538998.4

(51) Int. Cl.
*G06K 9/00* (2006.01)
*G06F 3/0488* (2013.01)
(Continued)

(52) U.S. Cl.
CPC ......... *G06K 9/00302* (2013.01); *G06F 3/012* (2013.01); *G06F 3/0233* (2013.01); *G06F 3/04886* (2013.01); *G06K 9/00275* (2013.01); *G06K 9/00281* (2013.01); *H04L 51/046* (2013.01); *H04L 51/10* (2013.01); *G06F 2203/011* (2013.01); *H04L 51/04* (2013.01)

(58) Field of Classification Search
None
See application file for complete search history.

(56) References Cited

U.S. PATENT DOCUMENTS

2014/0082520 A1* 3/2014 Mamoun ........... H04M 1/72544
                                                                    715/752
2015/0222586 A1   8/2015 Ebersman et al.
(Continued)

FOREIGN PATENT DOCUMENTS

CN       102103617 A     6/2011
CN       102842033 A     12/2012
(Continued)

OTHER PUBLICATIONS

Ali et al., "Face2Emoji:Using Facial Emotional Expressions to Filter Ennojis", May 2017 (Year: 2017).*
(Continued)

*Primary Examiner* — Randolph I Chu
(74) *Attorney, Agent, or Firm* — Lathrop GPM LLP

(57) ABSTRACT

The disclosure discloses a method and apparatus for inputting an emoticon. An embodiment of the method comprises: acquiring a facial image of a user, and locating a facial feature point of the facial image; determining facial expression information of the user based on a location of the facial feature point; selecting an emoticon matching the facial expression information from a preset emoticon library, wherein the emoticon library is used for correspondingly storing the emoticon and the facial expression information; and displaying the selected emoticon in an input interface. The embodiment increases the speed of inputting an emoticon.

11 Claims, 5 Drawing Sheets

(51) Int. Cl.
 *H04L 12/58* (2006.01)
 *G06F 3/023* (2006.01)
 *G06F 3/01* (2006.01)

(56) References Cited

U.S. PATENT DOCUMENTS

| | | | |
|---|---|---|---|
| 2015/0268780 A1 | 9/2015 | Kim et al. | |
| 2016/0070438 A1 | 3/2016 | Kim et al. | |
| 2016/0205049 A1* | 7/2016 | Kim | G06F 3/0488 455/414.1 |
| 2017/0103756 A1 | 4/2017 | Kobayashi et al. | |
| 2017/0262431 A1* | 9/2017 | Alam | G06Q 10/00 |

FOREIGN PATENT DOCUMENTS

| | | |
|---|---|---|
| CN | 102890776 A | 1/2013 |
| CN | 102984050 A | 3/2013 |
| CN | 103823561 A | 5/2014 |
| CN | 104410561 A | 3/2015 |
| CN | 104820548 A | 8/2015 |
| CN | 106033337 A | 10/2016 |
| CN | 106059907 A | 10/2016 |
| CN | 106372059 A | 2/2017 |
| CN | 106503630 A | 3/2017 |
| CN | 106570106 A | 4/2017 |
| CN | 106657650 A | 5/2017 |

OTHER PUBLICATIONS

WhatsApp ("wikiHow to Enlarge Emoji on WhatsApp", https://www.wikihow.com/Enlarge-Emoji-on-WhatsApp,https://web.archive.org/web/20170602023843/https://www.wikihow.com/Enlarge-Emoji-on-WhatsApp, archived on Jun. 2, 2017). (Year: 2017).*

"A 18 Facebook stamp which further expresses emotions by the use of a stamp is enlarged to start a friend!", a whole collection of iPhone&iPad techniques, Japan, Shinyusha Co., Ltd., Aug. 1, 2016.

* cited by examiner

METHOD AND APPARATUS FOR INPUTTING EMOTICON

CROSS-REFERENCE TO RELATED APPLICATIONS

This application claims priority to Chinese Patent Application No. 201710538998.4, filed with the State Intellectual Property Office of the People's Republic of China (SIPO) on Jul. 4, 2017, the content of which is incorporated herein by reference in its entirety.

TECHNICAL FIELD

The disclosure relates to the field of computer technology, specifically to the field of input method technology, and more specifically to a method and apparatus for inputting an emoticon.

BACKGROUND

Existing technologies provide certain techniques for inputting an emoticon: a user may select a corresponding emoticon from an emoticon list or input the emoticon by inputting a code representing the emoticon.

For a system requiring selecting an emoticon from a list to input the emoticon, a user needs to manually select from a specific list before each input, and with the increase of the number of symbols in the emoticon list, the user needs to spend increasingly more time in finding an emoticon before inputting the emoticon.

For a system using an identification code to input an emoticon, a user needs to remember the corresponding identification code or specific text of the emoticon. When the number of emoticons increases, more identification codes need to be remembered by the user, thereby slowing down the emoticon inputting speed of the user.

SUMMARY

An object of the disclosure is to provide an improved method and apparatus for inputting an emoticon, to solve the technical problems mentioned in the background part.

In a first aspect, an embodiment of the disclosure provides a method for inputting an emoticon. The method includes: acquiring a facial image of a user, and locating a facial feature point of the facial image; determining facial expression information of the user based on a location of the facial feature point; selecting an emoticon matching the facial expression information from a preset emoticon library, where the emoticon library is used for correspondingly storing the emoticon and the facial expression information; and displaying a selected emoticon in an input interface.

In some embodiments, the method further includes: acquiring sound information of the user, and extracting a keyword from the sound information; selecting an emoticon matching the keyword from a preset sound icon library, where the sound icon library is used for correspondingly storing the emoticon and the keyword; and displaying the emoticon matching the keyword in the input interface.

In some embodiments, the method further includes: detecting whether a duration of pressing the emoticon by the user is greater than a preset duration threshold; generating an enlarged emoticon if the duration of pressing the emoticon by the user is greater than the preset duration threshold; and displaying the enlarged emoticon in the input interface in response to detecting the user stopping pressing, where a size of the enlarged emoticon is directly proportional to the duration of pressing the emoticon.

In some embodiments, the method further includes: detecting whether a number of a given emoticon in the input interface is greater than a preset number threshold; and replacing a given emoticon having a number greater than the preset number threshold with an enlarged given emoticon, and displaying the enlarged given emoticon in the input interface, if the number of the given emoticon in the input interface is greater than the preset number threshold.

In some embodiments, the method further includes: recording, in response to detecting the user dragging the emoticon, trajectory data of dragging the emoticon by the user; and sending the dragged emoticon and the trajectory data to a target terminal to enable the target terminal to display the received emoticon according to the trajectory data.

In some embodiments, the method further includes: sending the emoticon matching the keyword and the sound information to a target terminal to enable the target terminal to display the emoticon and play the sound.

In a second aspect, an embodiment of the disclosure provides an apparatus for inputting an emoticon. The apparatus includes: a locating unit, for acquiring a facial image of a user, and locating a facial feature point of the facial image; a determining unit, for determining facial expression information of the user based on a location of the facial feature point; a selection unit, for selecting an emoticon matching the facial expression information from a preset emoticon library, where the emoticon library is used for correspondingly storing the emoticon and the facial expression information; and a display unit, for displaying a selected emoticon in an input interface.

In some embodiments, the apparatus further includes: an extraction unit, for acquiring sound information of the user, and extracting a keyword from the sound information; a matching unit, for selecting an emoticon matching the keyword from a preset sound icon library, where the sound icon library is used for correspondingly storing the emoticon and the keyword; and the display unit being further used for displaying the emoticon matching the keyword in the input interface.

In some embodiments, the apparatus further includes: a first detection unit, for detecting whether a duration of pressing the emoticon by the user is greater than a preset duration threshold; a generation unit, for generating an enlarged emoticon if the duration of pressing the emoticon by the user is greater than the preset duration threshold; and the display unit being further used for displaying the enlarged emoticon in the input interface in response to detecting the user stopping pressing, where a size of the enlarged emoticon is directly proportional to the duration of pressing the emoticon.

In some embodiments, the apparatus further includes: a second detection unit, for detecting whether a number of a given emoticon in the input interface is greater than a preset number threshold; and a replacing unit, for replacing a given emoticon having a number greater than the preset number threshold with an enlarged given emoticon and displaying the enlarged given emoticon in the input interface, if the number of the given emoticon in the input interface is greater than the preset number threshold.

In some embodiments, the apparatus further includes: a recording unit, for recording, in response to detecting the user dragging the emoticon, trajectory data of dragging the emoticon by the user; and a first sending unit, for sending the dragged emoticon and the trajectory data to a target terminal to enable the target terminal to display the received emoticon according to the trajectory data.

In some embodiments, the apparatus further includes a second sending unit, for sending the emoticon matching the keyword and the sound information to a target terminal to enable the target terminal to display the emoticon and play the sound.

In a third aspect, an embodiment of the disclosure provides a terminal, including: one or more processors; and a memory for storing one or more programs, where the one or more programs, when executed by the one or more processors, cause the one or more processors to implement any method according to the first aspect.

In a fourth aspect, an embodiment of the disclosure provides a computer readable storage medium storing a computer program therein, wherein the program implements, when executed by the processor, any method according to the first aspect.

The method and apparatus for inputting an emoticon provided by an embodiment of the disclosure acquire a facial image of a user to identify a facial emotion of the user, and select an emoticon matching the facial emotion of the user from a preset emoticon library, thereby improving the speed of inputting an emoticon.

BRIEF DESCRIPTION OF THE DRAWINGS

Other features, objects and advantages of the present disclosure will become more apparent upon reading the detailed description to the non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
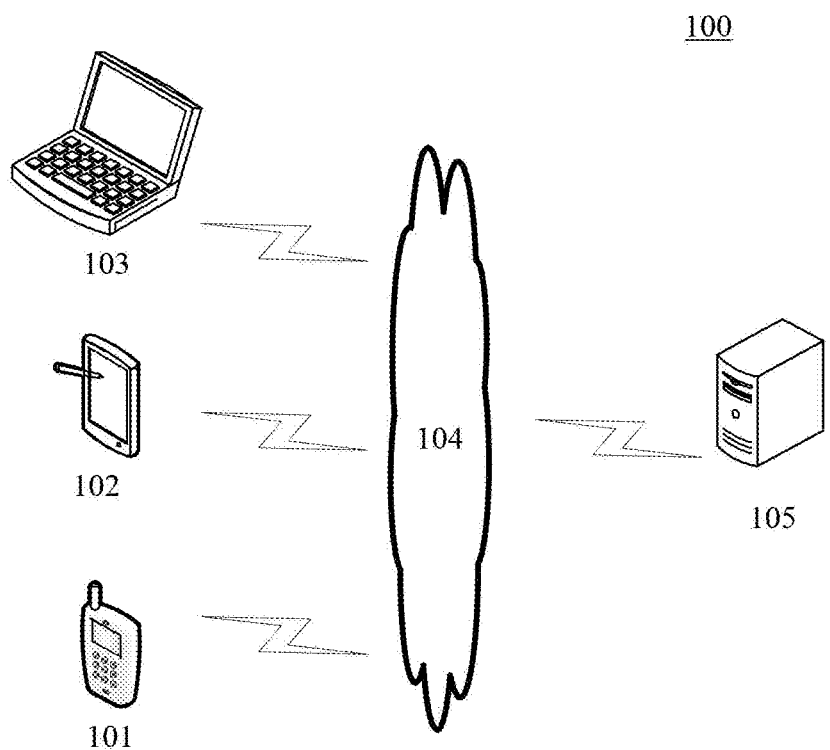
FIG. 1 is a structural diagram of an exemplary system in which the disclosure may be applied.

FIG. 1 shows an exemplary architecture of a system 100 in which a method for inputting an emoticon or an apparatus for inputting an emoticon according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, to transmit or receive messages, etc. Various communication client applications, such as cloud storage applications, shopping applications, search applications, instant messaging tools, mailbox clients, and social platform software may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a emoticon library server providing support for the emoticon displayed on the terminal devices 101, 102 and 103. The emoticon library server may perform analyzing on data such as the received facial expression information, and return a processing result (for example, an emoticon matching the facial expression information) to the terminal devices.

It should be noted that the emoticon inputting method according to the embodiments of the present disclosure is generally executed by the terminal devices 101, 102 and 103. Accordingly, the emoticon inputting apparatus is generally installed on the terminal devices 101, 102 and 103. Optionally, It may not use the emoticon library server but pre-store the emoticon library in the terminal devices 101, 1023, and 103 instead.

It should be appreciated that the numbers of the terminal devices, the networks and the servers in FIG. 1 are merely illustrative. Any number of terminal devices, networks and servers may be provided based on the actual requirements.

Figure 2:
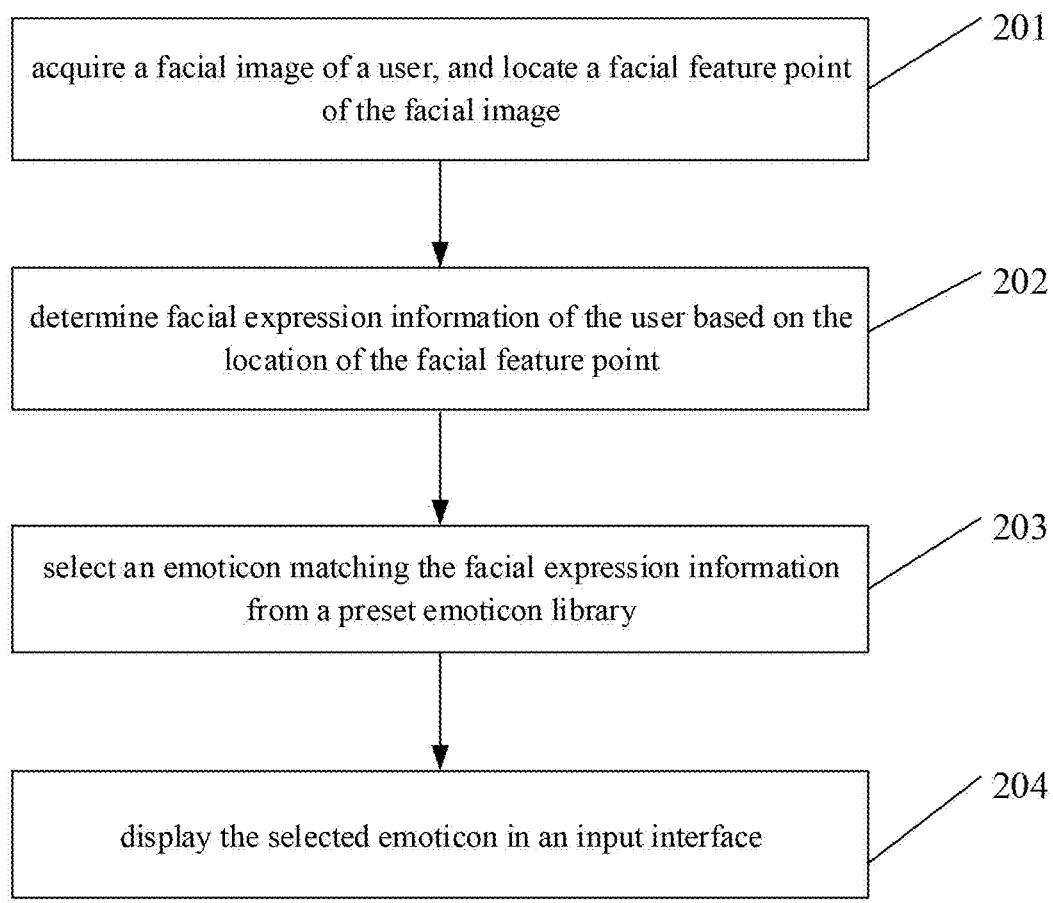
FIG. 2 is a flow chart of a method for inputting an emoticon according to an embodiment of the present disclosure.

By further referring to FIG. 2, a flow 200 of a method for inputting an emoticon according to an embodiment of the present disclosure is shown. The method for inputting an emoticon includes:

Step 201: acquiring a facial image of a user, and locating a facial feature point of the facial image.

In the present embodiment, an electronic device (e.g., the terminal device as shown in FIG. 1) in which the method for inputting an emoticon runs may acquire a facial image of a user through a camera in real time, and locate a facial feature point of the facial image. For example, when a user is using a mobile phone for instant messaging, face of the user may be photographed by a front-facing camera. When it needs to identify a face area in a facial image, key points of facial features may be firstly annotated on the facial image. After the key points of the facial features are annotated on the facial image, locations of the key points of the facial features on the facial image may be determined. Here, the facial features include, but are not limited to, eyes, nose, mouth, jaw, and the like. Here, the eyes include the left eye and the right eye, while the nose may be the nasal alar or the apex nasi. Here, the nasal alar includes the left nasal alar and the right nasal alar. Specifically, the facial features may also include cheeks, mandible, and the like. Here, the cheeks include the left cheek and the right cheek, while the mandible includes the left mandible and the right mandible. As may be appreciated, the facial features may also be the rest facial features, and are not limited in any way here.

Step 202: determining facial expression information of the user based on a location of the facial feature point.

In the present embodiment, the facial expression information is closely related to the facial features, and certain facial actions may be understood as facial expression information, but the facial expression information is more abundant and diversified than facial features. For example, a smile action will relate to a mouth action, and will also relate to facial contour changes and eye and eyebrow changes. The capture of facial features may only pay attention to individual organs, while the capture of facial expression information shall be implemented through monitoring eigenvalues of the whole faces. Accurate location information of facial feature points may be obtained through setting enough feature points. For example, a mouth shape is expressed by 50-60 feature points. When the mouth action is smiling, location coordinates of a plurality of feature points of the corners of the mouth will move upward, and will extend leftward and rightward; and when the mouth action is opening, a plurality of feature points annotating locations of the upper and lower lips will extend in the perpendicular direction. Similarly, the feature point annotation of eyes may also show openness and closure of the eyes, and blink action may be expressed by updating the captured location information in real time. The feature point location may be set according to whether locations of certain five sense organs readily change. Certain five sense organs having readily changing locations, e.g., eyes and mouth, may be defined using more feature points, so that the obtained actions will be more continuous; and certain five sense organs having non-readily changing locations, e.g., nose, may be defined using less feature points.

Step 203: selecting an emoticon matching the facial expression information from a preset emoticon library.

In the present embodiment, an emoticon library is used for correspondingly storing emoticons and facial expression information. The emoticon library may be acquired from a third party, and may also be preset in a terminal. A current facial expression of a user may be determined in the step 202. For example, when a user makes an emotion of sticking tongue out, the emoticon  may be selected from the emoticon library.

Step 204: displaying the selected emoticon in an input interface.

In the present embodiment, the emoticon selected in the step 203 is displayed in an input interface to enable a user to send the selected emoticon to a target terminal. The user may select a to-be-sent emoticon as needed, and delete unwanted emoticons.

In some optional implementations of the present embodiment, the method further includes: detecting whether a duration of pressing an emoticon by a user is greater than a preset duration threshold; generating an enlarged emoticon if the duration of pressing an emoticon by the user is greater than the preset duration threshold; and displaying the enlarged emoticon in the input interface in response to detecting the user stopping pressing, where the size of the enlarged emoticon is directly proportional to the duration of pressing the emoticon. The user may also edit a to-be-sent emoticon, and enlarge, by pressing an emoticon displayed in the input interface, the pressed emoticon. The longer is the press duration, the larger is the emoticon enlarged. Thus, it may be used to express an emotion of a user. For example, an angry emoticon enlarged by a plurality of times by pressing an angry emoticon is to express that the user is in extreme anger.

In some optional implementations of the present embodiment, the method further includes: detecting whether a number of a given emoticon in the input interface is greater than a preset number threshold; and replacing the give emoticon having a number greater than the preset number threshold with an enlarged given emoticon and displaying the enlarged given emoticon in the input interface, if the number of the given emoticon in the input interface is greater than the preset number threshold. For example, when a plurality of a given angry emoticon is continuously inputted, e.g., more than a present number (5), the given angry emoticon is joined and replaced with an enlarged given angry emoticon, to express a strong emotion of a user.

In some optional implementations of the present embodiment, the method further includes: recording, in response to detecting a user dragging an emoticon, trajectory data of dragging the emoticon by the user; and sending the dragged emoticon and the trajectory data to a target terminal to enable the target terminal to display the received emoticon according to the trajectory data. A user may drag an emoticon back and forth, enlarge the emoticon, and after the emoticon is sent to a target terminal, the emoticon displayed on the target terminal also changes with the dragging trajectory of the emoticon dragged by the user.

Figure 3:
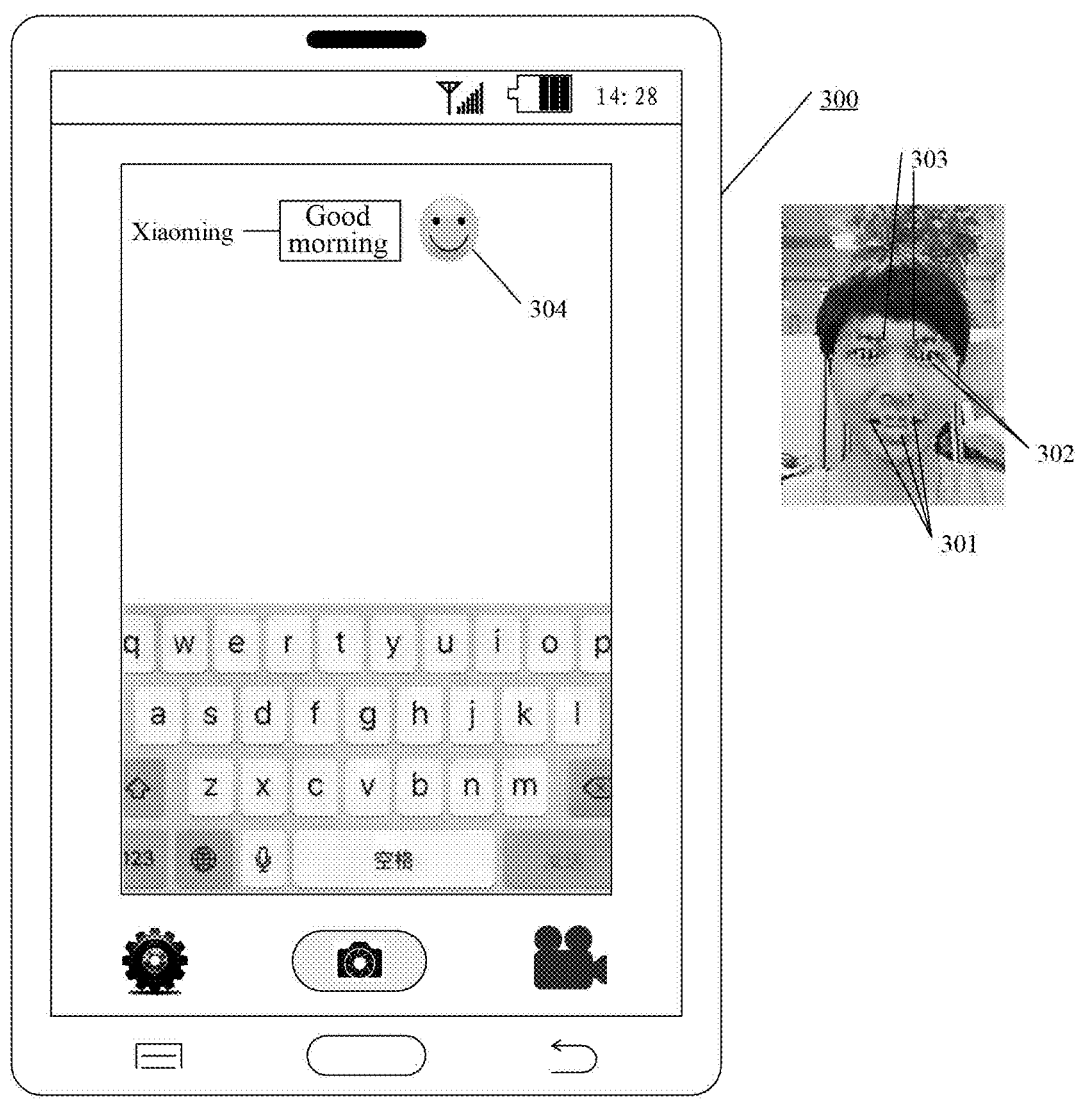
FIG. 3 is a schematic diagram of an application scenario of a method for inputting an emoticon according to the present disclosure.

By further referring to FIG. 3, FIG. 3 is a schematic diagram of an application scenario of a method for inputting an emoticon according to the present embodiment. In the application scenario in FIG. 3, a user firstly starts a camera of a terminal 300 to acquire a facial image. The terminal 300 locates facial feature points of the facial image to obtain a plurality of mouth feature points 301, eye feature points 302 and eyebrow feature points 303, and may determine the facial expression of the user as a smile based on locations of the plurality of mouth feature points 301, eye feature points 302 and eyebrow feature points 303. Then a smiley emoticon 304 is selected from a preset emoticon library, and displayed in an input interface.

The method according to the embodiments of the present disclosure determines a facial expression of a user by acquiring a facial feature point of the user, and then selects an emoticon matching the facial expression from a preset emoticon library, to achieve fast input of an emoticon.

Figure 4:
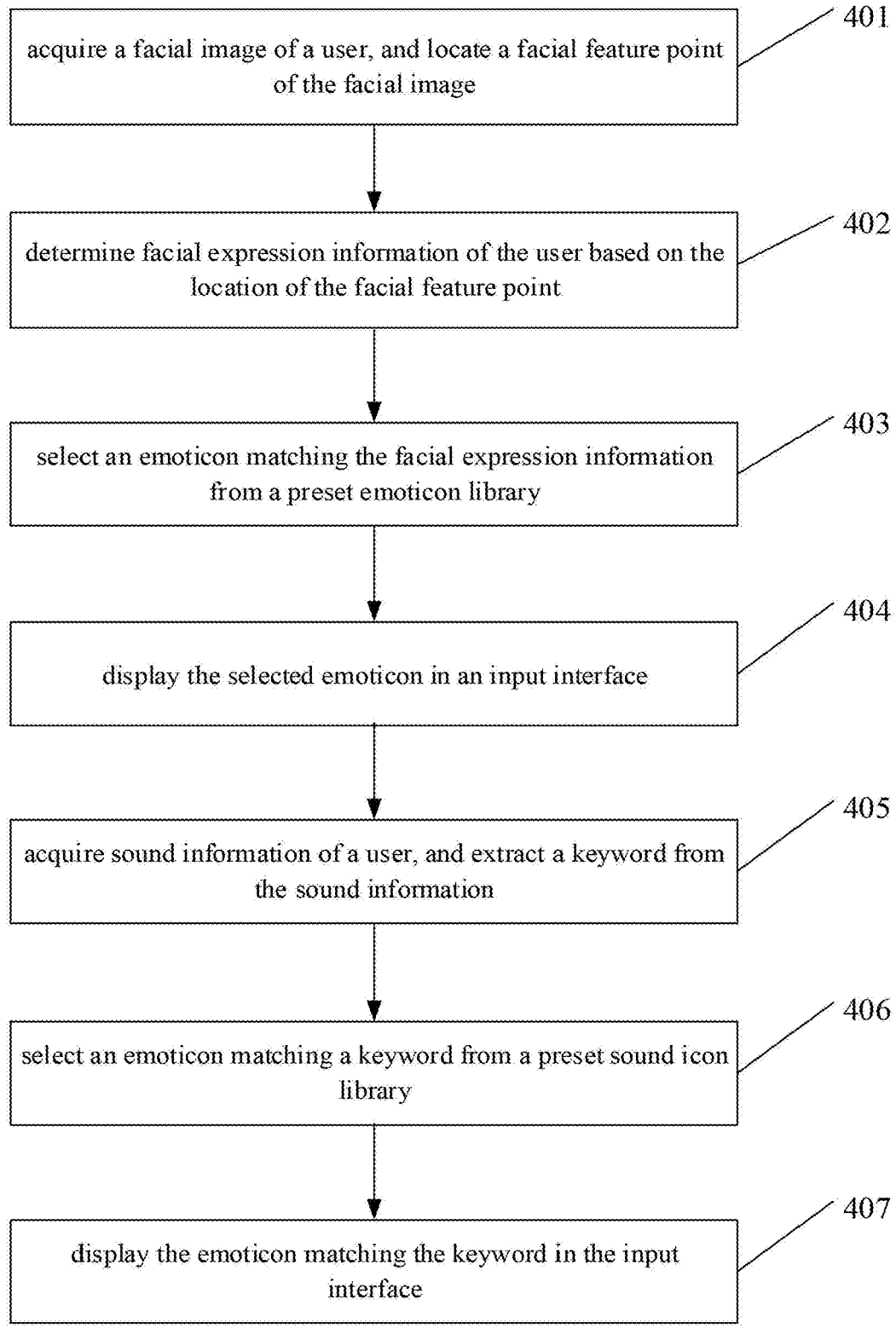
FIG. 4 is a flow chart of a method for inputting an emoticon according to another embodiment of the present disclosure.

By further referring to FIG. 4, a flow 400 of a method for inputting an emoticon according to another embodiment is shown. The flow 400 of the method for inputting an emoticon includes:

Step 401: acquiring a facial image of a user, and locating a facial feature point of the facial image.

Step 402: determining facial expression information of the user based on the location of the facial feature point.

Step 403: selecting an emoticon matching the facial expression information from a preset emoticon library.

Step 404: displaying the selected emoticon in an input interface.

The steps 401-404 are basically identical to the steps 201-204, and are therefore not repeated any more.

Step 405: acquiring sound information of a user, and extracting a keyword from the sound information.

In the present embodiment, a user may input sound information through a microphone or other audio input device. Words said by a user may be identified by sound recognition, or the sound from a user may be matched with a pre-recorded sound library to find similar sound, where the sound library stores a mapping relationship between sound and keyword. For example, a user sends sound of "hehe" when using a mobile phone for instant messaging. The mobile phone may extract a keyword "hehe" from the sound information. If a user says "piss me off", then a keyword "piss off" may be extracted therefrom. A sound library may also be pre-recorded to establish correspondence between sound and keywords. For example, various laughter may be recorded to correspond to a keyword "hehe". Or even, sneezing sound may be recorded to correspond to a keyword "sneeze". Drooling sound is recorded to correspond to a keyword "drool".

Step 406: selecting an emoticon matching a keyword from a preset sound icon library.

In the embodiment, a sound icon library is used for correspondingly storing emoticons and keywords. For example, a keyword "hehe" corresponds to . A sound icon library may be acquired from a third party, or be built in a terminal.

Step 407: displaying the emoticon matching the keyword in the input interface.

In the present embodiment, the emoticon selected in the step 406 is displayed in an input interface to enable the user to send the selected emoticon to a target terminal, e.g., a mobile phone of an instant messaging recipient. The user may select a to-be-sent emoticon as needed, and delete unwanted emoticons. In the process of capturing facial expressions of a user and converting the facial expressions into multiple continuous dynamic facial expressions, sound of the user in this process may be recorded simultaneously. A dynamic facial expression with sound may be played on a mobile phone of a recipient. The facial expression recognition process and the user typing process may be performed simultaneously, and the recognized facial expression may be automatically sent as a supplement after the user finishes typing.

In some optional implementations of the present embodiment, the method further includes: detecting whether a duration of pressing an emoticon by a user is greater than a preset duration threshold; generating an enlarged emoticon if the duration of pressing an emoticon by the user is greater than the preset duration threshold; and displaying the enlarged emoticon in the input interface in response to detecting the user stopping pressing, where the size of the enlarged emoticon is directly proportional to the duration of pressing the emoticon. The user may also edit a to-be-sent emoticon, and enlarge, by pressing an emoticon displayed in the input interface, the pressed emoticon. The longer is the press duration, the larger is the emoticon enlarged. Thus, it may be used for expressing an emotion of a user. For example, an angry emoticon enlarged by a plurality of times by pressing an angry emoticon is to express that the user is in extreme anger.

In some optional implementations of the present embodiment, the method further includes: detecting whether a number of a given emoticon in the input interface is greater than a preset number threshold; and replacing the given emoticon having a number greater than the preset number threshold with an enlarged given emoticon and displaying the enlarged given emoticon in the input interface, if the number of the given emoticon in the input interface is greater than the preset number threshold. The enlarged size of an emoticon may be proportional to the number of the emoticon. For example, when a plurality of a given angry emoticon is continuously inputted, e.g., more than a present number (5), the given angry emoticon is joined and replaced with an enlarged angry emoticon, to express a strong emotion of a user. An enlarged angry emoticon generated by 10 angry emoticons will have a larger size than an angry emoticon generated by 5 angry emoticons.

In some optional implementations of the present embodiment, the method further includes: recording, in response to detecting a user dragging an emoticon, trajectory data of dragging the emoticon by the user; and sending the dragged emoticon and the trajectory data to a target terminal to enable the target terminal to display the received emoticon according to the trajectory data. A user may drag an emoticon back and forth, enlarge the emoticon, and after the emoticon is sent to a target terminal, the emoticon displayed on the target terminal also changes with the dragging trajectory of the emoticon dragged by the user.

As can be seen from FIG. 4, compared with the embodiment corresponding to FIG. 2, a flow 400 of a method for inputting an emoticon according to the present embodiment highlights inputting an emoticon through sound. Accordingly, the solution according to the present embodiment may introduce more emoticons, thereby achieving more comprehensive emoticon inputting, and further increasing the speed of the emoticon inputting.

Figure 5:
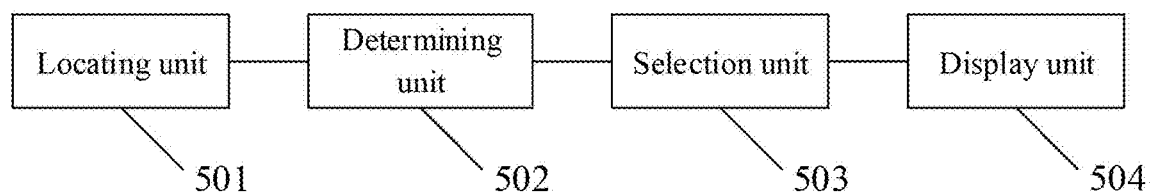
FIG. 5 is a schematic structural diagram of an apparatus for inputting an emoticon according to an embodiment of the present disclosure.

By further referring to FIG. 5, as implementations of the methods shown in the above figures, the disclosure provides an embodiment of an apparatus for inputting an emoticon. The embodiment of the apparatus corresponds to the embodiment of the method shown in FIG. 2, and the apparatus may be specifically applied in a variety of electronic devices.

As shown in FIG. 5, an apparatus 500 for inputting an emoticon according to the present embodiment includes: a locating unit 501, a determining unit 502, a selection unit 503, and a display unit 504. The locating unit 501 is used for acquiring a facial image of a user, and locating a facial feature point of the facial image; the determining unit 502 is used for determining facial expression information of the user based on the location of the facial feature point; the selection unit 503 is used for selecting an emoticon matching the facial expression information from a preset emoticon library, where the emoticon library is used for correspondingly storing emoticons and facial expression information; and the display unit 504 is used for displaying the selected emoticon in an input interface.

In the present embodiment, specific processing of the locating unit 501, the determining unit 502, the selection unit 503, and the display unit 504 of the apparatus 500 for inputting an emoticon may be referred to in the steps 201, 202, 203 and 204 in the embodiment corresponding to FIG. 2.

In some optional implementations of the embodiment, the apparatus 500 further includes: an extraction unit (not shown), for acquiring sound information of a user, and extracting a keyword from the sound information; a matching unit (not shown), for selecting an emoticon matching the keyword from a preset sound icon library, where the sound icon library is used for correspondingly storing emoticons and keywords; and the display unit 504 being further used for displaying the emoticon matching the keyword in the input interface.

In some optional implementations of the present embodiment, the apparatus 500 further includes: a first detection unit (not shown), for detecting whether a duration of pressing an emoticon by a user is greater than a preset duration threshold; a generation unit (not shown), for generating an enlarged emoticon if the duration of pressing an emoticon by the user is greater than the preset duration threshold; and the display unit 504 being further used for displaying the enlarged emoticon in the input interface in response to detecting the user stopping pressing, where a size of the enlarged emoticon is directly proportional to the duration of pressing the emoticon.

In some optional implementations of the embodiment, the apparatus 500 further includes: a second detection unit (not shown), for detecting whether a number of a given emoticon in the input interface is greater than a preset number threshold; and a replacing unit (not shown), for replacing a given emoticon having a number greater than the preset number threshold with an enlarged given emoticon and displaying the enlarged given emoticon in the input interface, if the number of the given emoticon in the input interface is greater than the preset number threshold.

In some optional implementations of the present embodiment, the apparatus 500 further includes: a recording unit (not shown), for recording, in response to detecting a user dragging an emoticon, trajectory data of dragging the emoticon by the user; and a first sending unit (not shown), for sending the dragged emoticon and the trajectory data to a target terminal to enable the target terminal to display the received emoticon according to the trajectory data.

In some optional implementations of the present embodiment, the apparatus 500 further includes a second sending unit (not shown), for sending the emoticon matching the keyword and the sound information to a target terminal to enable the target terminal to display the emoticon and play the sound.

Figure 6:
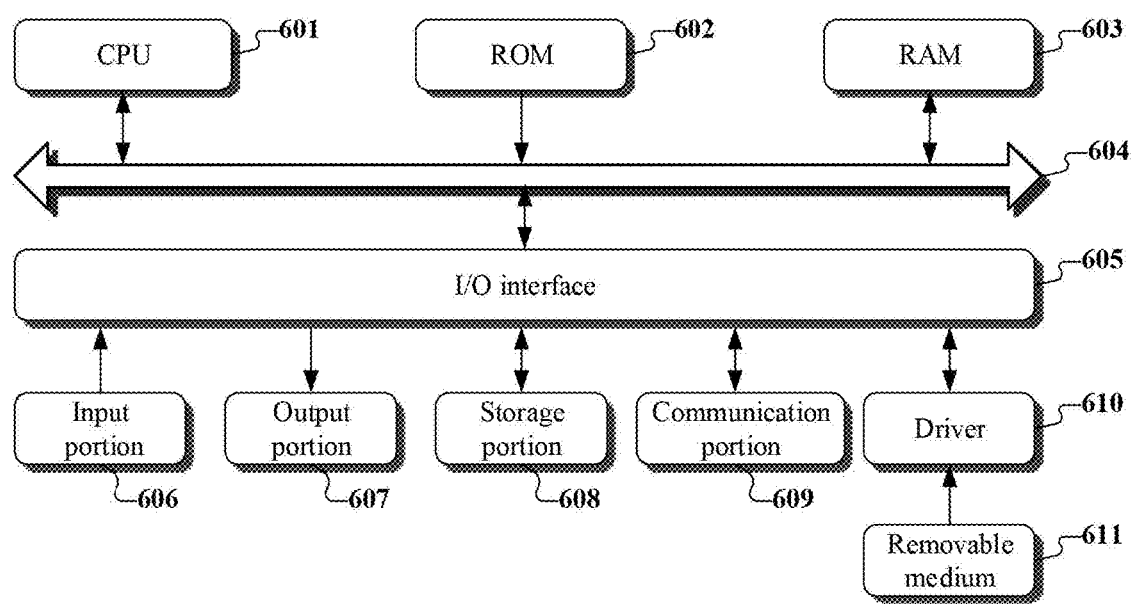
FIG. 6 is a schematic structural diagram of a computer system suitable for implementing a terminal device according to an embodiment of the disclosure.

Referring to FIG. 6, a schematic structural diagram of a computer system 600 of a terminal device adapted to implement the embodiments of the present disclosure is shown. The terminal device shown in FIG. 6 is merely an example and should bring no limitation to the function and usage range of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion X09, and/or may be installed from the removable media X11. The computer program, when executed by the central processing unit (CPU) X01, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a locating unit, a determining unit, a selection unit, and a display unit where the names of these units or modules do not in some cases constitute a limitation to such units or modules themselves. For example, the locating unit may also be described as "a unit for acquiring a facial image of a user, and locating a facial feature point of the facial image".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a facial image of a user, and locating a facial feature point of the facial image; determine facial expression information of the user based on a location of the facial feature point; select an emoticon matching the facial expression information from a preset emoticon library, wherein the emoticon library is used for correspondingly storing the emoticon and the facial expression information; and display a selected emoticon in an input interface.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for inputting an emoticon, comprising:
   acquiring a facial image of a user, and locating a facial feature point of the facial image;
   determining facial expression information of the user based on a location of the facial feature point;
   selecting an emoticon matching the facial expression information from a preset emoticon library, wherein the emoticon library is used for correspondingly storing the emoticon and the facial expression information; and
   displaying a selected emoticon in an input interface;
   the method further comprising:
   detecting whether a number of a given emoticon in the input interface is greater than a preset number threshold; and
   replacing a given emoticon having a number greater than the preset number threshold with an enlarged given emoticon and displaying the enlarged given emoticon in the input interface, if the number of the given emoticon in the input interface is greater than the preset number threshold, a size of the enlarged given emoticon being directly proportional to the number of the given emoticon.

2. The method according to claim 1, further comprising:
   acquiring sound information of the user, and extracting a keyword from the sound information;
   selecting an emoticon matching the keyword from a preset sound icon library, wherein the sound icon library is used for correspondingly storing the emoticon and the keyword; and
   displaying the emoticon matching the keyword in the input interface.

3. The method according to claim 1, further comprising:
   detecting whether a duration of pressing the emoticon by the user is greater than a preset duration threshold;
   generating an enlarged emoticon if the duration of pressing the emoticon by the user is greater than the preset duration threshold; and
   displaying the enlarged emoticon in the input interface in response to detecting the user stopping pressing, wherein a size of the enlarged emoticon is directly proportional to the duration of pressing the emoticon.

4. The method according to claim 2, further comprising:
   sending the emoticon matching the keyword and the sound information to a target terminal to enable the target terminal to display the emoticon and play the sound.

5. An apparatus for inputting an emoticon, comprising:
   at least one processor; and
   a memory storing instructions, the instructions when executed by the at least one processor, cause the at least one processor to perform operations, the operations comprising:
   acquiring a facial image of a user, and locating a facial feature point of the facial image;
   determining facial expression information of the user based on a location of the facial feature point;
   selecting an emoticon matching the facial expression information from a preset emoticon library, wherein the emoticon library is used for correspondingly storing the emoticon and the facial expression information; and
   displaying a selected emoticon in an input interface;
   the operations further comprising:
   detecting whether a number of a given emoticon in the input interface is greater than a preset number threshold; and
   replacing a given emoticon having a number greater than the preset number threshold with an enlarged given emoticon and displaying the enlarged given emoticon in the input interface, if the number of the given emoticon in the input interface is greater than the preset number threshold, a size of the enlarged given emoticon being directly proportional to the number of the given emoticon.

6. The apparatus according to claim 5, wherein the operations further comprise:
   acquiring sound information of the user, and extracting a keyword from the sound information;
   selecting an emoticon matching the keyword from a preset sound icon library, wherein the sound icon library is used for correspondingly storing the emoticon and the keyword; and
   displaying the emoticon matching the keyword in the input interface.

7. The apparatus according to claim 5, the operations further comprise:
   detecting whether a duration of pressing the emoticon by the user is greater than a preset duration threshold;
   generating an enlarged emoticon if the duration of pressing the emoticon by the user is greater than the preset duration threshold; and
   displaying the enlarged emoticon in the input interface in response to detecting the user stopping pressing, wherein a size of the enlarged emoticon is directly proportional to the duration of pressing the emoticon.

8. The apparatus according to claim 6, wherein the operations further comprise:

sending the emoticon matching the keyword and the sound information to a target terminal to enable the target terminal to display the emoticon and play the sound.

9. A non-transitory computer readable storage medium storing a computer program, wherein the computer program, when executed by a processor, cause the processor to perform operations, the operations comprising:

acquiring a facial image of a user, and locating a facial feature point of the facial image;

determining facial expression information of the user based on a location of the facial feature point;

selecting an emoticon matching the facial expression information from a preset emoticon library, wherein the emoticon library is used for correspondingly storing the emoticon and the facial expression information; and displaying a selected emoticon in an input interface;

the operations further comprising:

detecting whether a number of a given emoticon in the input interface is greater than a preset number threshold; and replacing a given emoticon having a number greater than the preset number threshold with an enlarged given emoticon and displaying the enlarged given emoticon in the input interface, if the number of the given emoticon in the input interface is greater than the preset number threshold, a size of the enlarged given emoticon being directly proportional to the number of the given emoticon.

10. The method according to claim 1, further comprising:

recording, in response to detecting the user dragging the emoticon, trajectory data of dragging the emoticon by the user; and sending the dragged emoticon and the trajectory data to a target terminal to enable the target terminal to display the received emoticon according to the trajectory data.

11. The apparatus according to claim 5, wherein the operations further comprise:

recording, in response to detecting the user dragging the emoticon, trajectory data of dragging the emoticon by the user; and sending the dragged emoticon and the trajectory data to a target terminal to enable the target terminal to display the received emoticon according to the trajectory data.

* * * * *